M. FISCHER.
INTERCHANGEABLE WHEEL OF MOTOR CARS.
APPLICATION FILED SEPT. 17, 1912.
1,099,435.  Patented June 9, 1914.
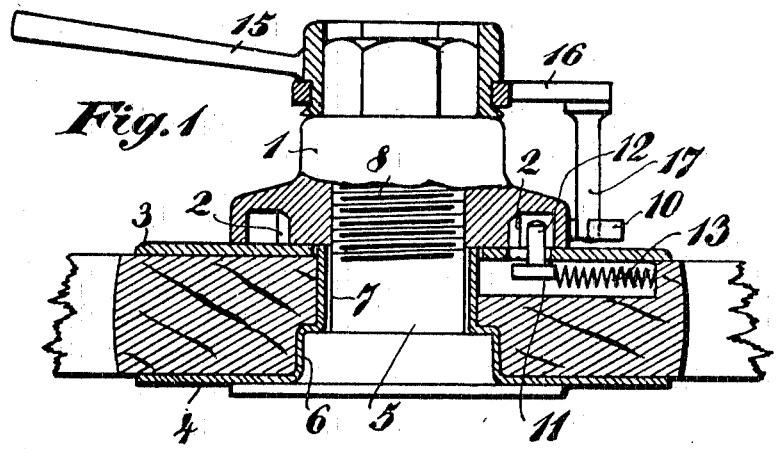
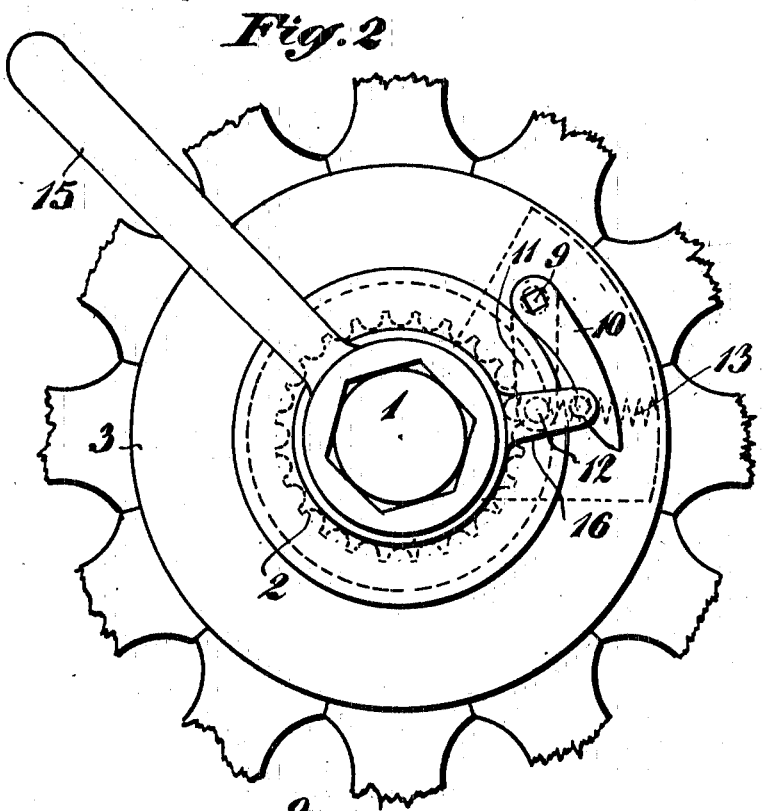
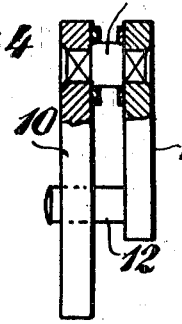
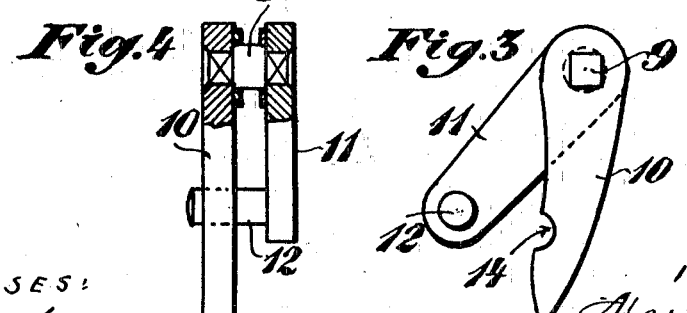
WITNESSES:
John C. Sanders
Albert F. Heuman
INVENTOR:
Martin Fischer
BY
ATTY

UNITED STATES PATENT OFFICE.

MARTIN FISCHER, OF ZURICH, SWITZERLAND, ASSIGNOR TO MOTOR AND GEAR IMPROVEMENT COMPANY, A CORPORATION OF NEW YORK.

INTERCHANGEABLE WHEEL OF MOTOR-CARS.

1,099,435.  Specification of Letters Patent.  Patented June 9, 1914.

Application filed September 17, 1912. Serial No. 720,880.

*To all whom it may concern:*

Be it known that I, MARTIN FISCHER, a citizen of Switzerland, residing at Zurich, Switzerland, have invented new and useful Improvements in Interchangeable Wheels of Motor-Cars, of which the following is a specification.

This invention is to produce a means for securely locking and readily unlocking the securing cap on an interchangeable wheel hub, particularly with the object of affording means for locking the interchangeable wheels of motor car hubs in a manner certain to prevent accidental release and comprising devices in construction well protected and easy to handle.

In the construction of motor car wheels, it has become a practice to have the hub arranged to remain on the axle and to have the wheel center formed as a separate hub or nave to fit the relatively permanent hub, and to employ means for rigidly securing the separate hub to the relatively permanent hub, and to readily detach the same when it is desired to replace the wheel and tire complete. This takes the place of replacing tires in case of puncture on the road. Devices for holding such detachable wheels have been suggested, and some are in use, but the means of locking to prevent accidental detachment is either insecure or of complicated construction, or includes projections or holes liable to breakage or derangement by dirt.

This invention involves simple means and an arrangement and combination which is not in ordinary use liable to any derangement.

In the accompanying drawings showing one form of the embodiment of my construction,—Figure 1. is a section of the hub with wheel and cap in position. Fig. 2. is a side elevation of the hub with cap in position and operating wrench. Fig. 3. is an elevation, part section, of lock. Fig. 4. is a side view of lock.

In the drawings, 1 is cap with an angular head at the outer end and flared inner end forming a clamping flange which is recessed on its inner face and in the recess, the inner side is serrated or toothed, and adapted to receive a locking pin 12.

On the relatively permanent hub 5 is an inner flange and a collar 6 and shank 7 and threaded end 8. The wheel portion comprises the spokes with an inner flange 4, and an outer flange 3. At one point in the circumference there is a recess in the spokes in flange 4, adapted to receive the lock shown in Figs. 3 and 4. In this recess is the locking lever 11, with locking pin 12 completely inclosed and protected under the flange 3, while the pivot 9 projects through the flange and is attached to it and operates finger 10 with notch 14 near its end. In the recess there is also a spring 13 operating on the end of the arm 11 tending to force that arm with its pin 12 radially inward, so that the pin engages the serrations or notches on the inner side of the cap flange 1.

The operating wrench has the usual angular opening to engage the end of the cap and attached to the hub 15, is a loose ring 16 with a projecting pin 17.

The operation of this device is obvious from the drawings and consists in applying the wrench to the securing cap 1, and rotating the loose ring 16 so that the pin presses the end of the finger 10 outward until the pin 17 rests in the notch 14. In this position the lock is pivoted at 9 so that pin 12 is thrown radially outward against the spring 13, and the pin 12 is out of engagement with the notches on the locking cap flange. In that position the wrench is operated to screw up the cap 1 to the desired degree, securely clamping the wheel to the semi-permanent hub, and when sufficiently tight, the loose ring 16 is rotated slightly releasing pin 17 from notch 14 whereupon spring 13 forces arm 11 inward so that pin 12 engages one of the notches on the inner face of the locking cap, and in such position locks the cap against unscrewing. Conversely, when it is desired to remove the cap, the wrench is applied, loose ring 16 rotating until pin 17 engages finger 10, and forces it outward thereby releasing the locking pin 12, after which the wrench can readily operate to unscrew the cap 1.

It will be noted that the operation of the lock involves completely inclosed parts. That is the serration and locking pin are all protected by the flange 3 or by the flared inner flange of cap 1, with the exception that the operating finger 10 is on the outside. This finger 10, however, owing to my construction, can be of such form as to hold securely against the cap flange 1, and not protrude in any way offering a chance for engagement with obstacles. In a sense it presents a flush construction that cannot catch on anything and covers all openings, thereby preventing the entry of dust and dirt to interfere with satisfactory operation.

This invention is susceptible to various modifications from the particular form in which I have shown and described it, but

What I claim and desire to secure by Letters Patent is:—

1. In combination in a detachable wheel, a relatively permanent hub, a removable wheel hub, a locking cap having a flared inner end constituting a clamping flange, a recess on the face of the clamping flange, notches in one side of the recess, a locking pin movable toward and from center of the removable wheel hub entirely protected by a flange plate on said hub and the clamping flange, a pivot supported in said hub flange plate, an operating finger on the outside of said pivot adapted in its normal position to rest in contact with the edge of the cap flange.

2. In combination in a detachable wheel, a securing cap having an inner flaring end constituting a clamping flange, a detachable wheel hub, a face plate on the outer side of the detachable wheel hub, a lock for said securing cap, a pivot for said lock carried by said face plate, a recess in said hub under said face plate, a locking pin and arm in said recess whereby the arm and spring are entirely protected by said face plate, and are adapted to move toward and from the hub center, a single member of the locking means located outside of said face plate and attached to said pivot for operating the lock for the purpose described.

3. In combination in a detachable wheel, a relatively permanent hub, a removable wheel hub, a face plate on the outer side of the hub, a hub cap flange adapted to engage said face plate to lock the removable hub to the relatively permanent hub, locking means to secure said hub cap flange, including a lever and spring located in a recess in the removable hub and protected by said face plate, a pivot for said lever in said face plate, means on the other end of said lever projecting through the face plate adapted to move toward and away from the hub center to engage a recess on the inner side of the cap flange, and a lever outside of said face plate adapted to move toward and away from the hub center and to normally lie against the outer periphery of the cap flange for the purpose described.

In testimony whereof I have signed my name to this specification in the presence of two subscribing witnesses.

MARTIN FISCHER.

Witnesses:
JOHANNES AUMUND,
GUIDO ADLER.